(12) United States Patent
McKenzie (10) Patent No.: US 12,471,751 B1
(45) Date of Patent: Nov. 18, 2025

(54) DISH STAND

(71) Applicant: Qualita McKenzie, District Heights, MD (US)

(72) Inventor: Qualita McKenzie, District Heights, MD (US)

( * ) Notice: Subject to any disclaimer, the term of this patent is extended or adjusted under 35 U.S.C. 154(b) by 0 days.

(21) Appl. No.: 18/773,907

(22) Filed: Jul. 16, 2024

(51) Int. Cl.
| | |
|---|---|
| A47L 19/04 | (2006.01) |
| A47B 81/04 | (2006.01) |
| A47F 7/00 | (2006.01) |
| A47J 47/16 | (2006.01) |
| A47F 5/00 | (2006.01) |

(52) U.S. Cl.
CPC .............. *A47L 19/04* (2013.01); *A47B 81/04* (2013.01); *A47F 7/0064* (2013.01); *A47J 47/16* (2013.01); *A47F 5/005* (2013.01)

(58) Field of Classification Search
CPC ......... A47L 19/04; A47J 47/16; A47F 7/0064; A47F 5/005; A47F 7/0021; A47F 7/0028; A47B 81/04; A47B 81/00; A47K 1/09
USPC ...................................... 211/41.2, 41.3, 41.7
See application file for complete search history.

(56) References Cited

U.S. PATENT DOCUMENTS

| | | | | |
|---|---|---|---|---|
| 846,263 | A * | 3/1907 | Tibbits ..................... | A47L 19/04 220/572 |
| 1,692,003 | A * | 11/1928 | Thayer ..................... | A47L 17/02 220/572 |
| 2,479,118 | A * | 8/1949 | Jenness ................... | A47L 19/04 211/195 |
| 2,954,875 | A * | 10/1960 | Becker .................... | A47L 19/02 211/41.3 |
| 3,027,041 | A * | 3/1962 | Stansbury, Jr. ......... | A47L 19/04 220/555 |
| 3,889,837 | A * | 6/1975 | Wilson ............... | B65D 11/1833 D32/55 |
| D271,340 | S * | 11/1983 | Taylor ............................ | D32/55 |
| 4,531,641 | A * | 7/1985 | Archambault .......... | A47L 19/02 211/208 |
| 4,731,177 | A * | 3/1988 | Hemman ................ | B01D 29/03 210/94 |
| 4,756,582 | A | 7/1988 | Heien | |
| 4,854,537 | A * | 8/1989 | Welch .................... | A47B 81/04 4/656 |
| 4,884,714 | A * | 12/1989 | Bechtel ................... | A47J 47/20 211/2 |

(Continued)

*Primary Examiner* — Devin K Barnett
(74) *Attorney, Agent, or Firm* — Kyle A. Fletcher, Esq.

(57) ABSTRACT

The improved dish stand is configured for use with cookware, crockery, and cutlery. The improved dish stand forms a containment structure that elevates the cookware, crockery, and cutlery above a supporting surface. The improved dish stand receives the cookware, crockery, and cutlery while the cookware, crockery, and cutlery is wet. The improved dish stand forms a structure that: a) allows gravity to drain water from the cookware, crockery, and cutlery; and, b) provides a flow path that transports the drained water into the DWV of a domestic plumbing system. The improved dish stand incorporates a pedestal structure, a stand structure, and a plurality of segregated spaces. The pedestal structure is a load bearing structure that elevates the stand structure above the supporting surface. The plurality of segregated structures are formed within the stand structure. The stand structure forms the physical structure that receives the cookware, crockery, and cutlery.

12 Claims, 5 Drawing Sheets

(56) References Cited

U.S. PATENT DOCUMENTS

| | | | | |
|---|---|---|---|---|
| 5,119,943 A * | 6/1992 | Hoang | | A47L 19/00 |
| | | | | 211/168 |
| 5,158,184 A * | 10/1992 | Craft | | A47L 19/04 |
| | | | | D32/55 |
| 5,184,749 A * | 2/1993 | Attenasio | | A47L 13/51 |
| | | | | 220/736 |
| 5,588,539 A * | 12/1996 | Belden, Jr. | | A47L 19/04 |
| | | | | 211/41.3 |
| 5,704,492 A * | 1/1998 | Bartko | | A47J 47/20 |
| | | | | 211/41.3 |
| 6,021,906 A | 2/2000 | Helen | | |
| 6,161,718 A * | 12/2000 | Monbo | | A47L 19/04 |
| | | | | 220/486 |
| 7,325,695 B2 * | 2/2008 | Yang | | A47L 19/04 |
| | | | | 211/41.3 |
| D586,061 S * | 2/2009 | Curtin | | D32/55 |
| D599,068 S * | 8/2009 | Yang | | D32/55 |
| D599,069 S * | 8/2009 | Curtin | | D32/55 |
| 7,748,543 B2 * | 7/2010 | Yang | | A47L 19/04 |
| | | | | 211/41.3 |
| 8,047,373 B2 * | 11/2011 | Murphy | | A47B 88/90 |
| | | | | 206/553 |
| 8,127,942 B2 | 3/2012 | Meshkinfam | | |
| D662,785 S * | 7/2012 | Kern | | D32/55 |
| D667,278 S * | 9/2012 | Murphy | | D7/637 |
| D677,443 S * | 3/2013 | Urdaneta | | D32/55 |
| D701,394 S * | 3/2014 | Lin | | D6/534 |
| D714,508 S * | 9/2014 | Joy | | D32/55 |
| D716,105 S * | 10/2014 | Lo | | D7/637 |
| 8,973,763 B2 * | 3/2015 | Pargansky | | A47L 19/04 |
| | | | | 211/16 |
| 9,039,001 B2 * | 5/2015 | Haeuselmann | | A47L 19/04 |
| | | | | 220/572 |
| D765,334 S * | 8/2016 | Donald | | D32/55 |
| D766,530 S * | 9/2016 | Kent | | D32/55 |
| 9,549,659 B2 * | 1/2017 | Jensen | | A47L 15/501 |
| 9,649,010 B2 | 5/2017 | Oh | | |
| D816,933 S * | 5/2018 | Klipshtein | | D32/55 |
| D827,329 S * | 9/2018 | Joseph | | D6/528 |
| D833,699 S * | 11/2018 | Serrahima | | D32/55 |
| D842,660 S * | 3/2019 | Evans | | D7/637 |
| D871,701 S * | 12/2019 | Goodman | | D32/55 |
| D878,084 S * | 3/2020 | McGarry | | D6/525 |
| D919,218 S * | 5/2021 | Asis | | D32/55 |
| D949,640 S * | 4/2022 | Liu | | D7/640 |
| D949,641 S * | 4/2022 | Liu | | D7/640 |
| D957,774 S * | 7/2022 | Han | | D32/55 |
| D981,672 S * | 3/2023 | Yao | | D32/55 |
| D984,075 S * | 4/2023 | Zhang | | D32/55 |
| D988,026 S * | 6/2023 | Chen | | D6/534 |
| D988,027 S * | 6/2023 | Chen | | D6/534 |
| D991,610 S * | 7/2023 | Xu | | D32/55 |
| D1,012,538 S * | 1/2024 | Yu | | D6/534 |
| D1,031,195 S * | 6/2024 | Jiang | | D32/55 |
| D1,049,796 S * | 11/2024 | Lai | | D7/637 |
| 2001/0040141 A1 * | 11/2001 | Martorella | | A47L 19/04 |
| | | | | 211/41.6 |
| 2004/0238464 A1 * | 12/2004 | Cheung | | A47L 19/02 |
| | | | | 211/41.3 |
| 2006/0138063 A1 * | 6/2006 | Johnson | | A47L 19/04 |
| | | | | 211/41.3 |
| 2006/0169652 A1 * | 8/2006 | Yang | | A47G 21/14 |
| | | | | 211/41.3 |
| 2007/0090063 A1 * | 4/2007 | Schmidt | | A47L 19/04 |
| | | | | 211/41.3 |
| 2007/0131629 A1 * | 6/2007 | Sullivan | | A47L 19/04 |
| | | | | 211/41.3 |
| 2007/0144984 A1 * | 6/2007 | Sullivan | | A47L 19/04 |
| | | | | 211/41.3 |
| 2008/0179264 A1 * | 7/2008 | Abrams | | A47L 19/02 |
| | | | | 34/104 |
| 2010/0012601 A1 * | 1/2010 | Meshkinfam | | A47L 19/04 |
| | | | | 211/41.3 |
| 2010/0059459 A1 * | 3/2010 | Mulaw | | A47L 19/04 |
| | | | | 211/41.3 |
| 2010/0059460 A1 * | 3/2010 | Mulaw | | A47L 19/04 |
| | | | | 211/41.3 |
| 2010/0065517 A1 * | 3/2010 | Lam | | A47L 19/04 |
| | | | | 211/41.3 |
| 2011/0290747 A1 * | 12/2011 | Affonso | | A47L 19/04 |
| | | | | 211/41.3 |
| 2012/0138550 A1 * | 6/2012 | Wisniewski | | A47L 19/04 |
| | | | | 211/41.3 |
| 2014/0251930 A1 * | 9/2014 | Pargansky | | A47L 19/04 |
| | | | | 211/16 |
| 2014/0332479 A1 * | 11/2014 | Audet | | A47J 47/20 |
| | | | | 211/41.3 |
| 2014/0367350 A1 * | 12/2014 | Waksul | | A47F 7/0071 |
| | | | | 211/41.2 |
| 2015/0297058 A1 * | 10/2015 | Kent | | A47L 19/04 |
| | | | | 211/41.6 |
| 2016/0068325 A1 * | 3/2016 | Prommel | | A47J 47/005 |
| | | | | 206/576 |
| 2017/0215691 A1 * | 8/2017 | Henry | | A47B 81/04 |
| 2017/0245730 A1 * | 8/2017 | Dunn | | A47L 19/04 |
| 2019/0159632 A1 * | 5/2019 | Stevens | | A47B 77/18 |
| 2020/0178759 A1 * | 6/2020 | Han | | A47L 19/04 |
| 2022/0202272 A1 * | 6/2022 | Klug | | F26B 9/003 |
| 2022/0369894 A1 * | 11/2022 | Moss | | A47L 19/04 |
| 2024/0382063 A1 * | 11/2024 | Klug | | A47L 19/04 |

\* cited by examiner

DISH STAND

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Not Applicable

SUMMARY OF INVENTION

The improved dish stand is a is a mechanical device. The improved dish stand is configured for use with cookware, crockery, and cutlery. The improved dish stand forms a containment structure that elevates the cookware, crockery, and cutlery above a supporting surface. The improved dish stand receives the cookware, crockery, and cutlery while the cookware, crockery, and cutlery is wet. The improved dish stand forms a structure that: a) allows gravity to drain water from the cookware, crockery, and cutlery; and, b) provides a flow path that transports the drained water into the DWV of a domestic plumbing system. The improved dish stand comprises a pedestal structure, a stand structure, and a plurality of segregated spaces. The pedestal structure is a load bearing structure that elevates the stand structure above the supporting surface. The plurality of segregated structures are formed within the stand structure. The stand structure forms the physical structure that receives the cookware, crockery, and cutlery.

These together with additional objects, features and advantages of the improved dish stand will be readily apparent to those of ordinary skill in the art upon reading the following detailed description of the presently preferred, but nonetheless illustrative, embodiments when taken in conjunction with the accompanying drawings.

In this respect, before explaining the current embodiments of the improved dish stand in detail, it is to be understood that the improved dish stand is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the improved dish stand.

It is therefore important that the claims be regarded as including such equivalent construction insofar as they do not depart from the spirit and scope of the improved dish stand. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
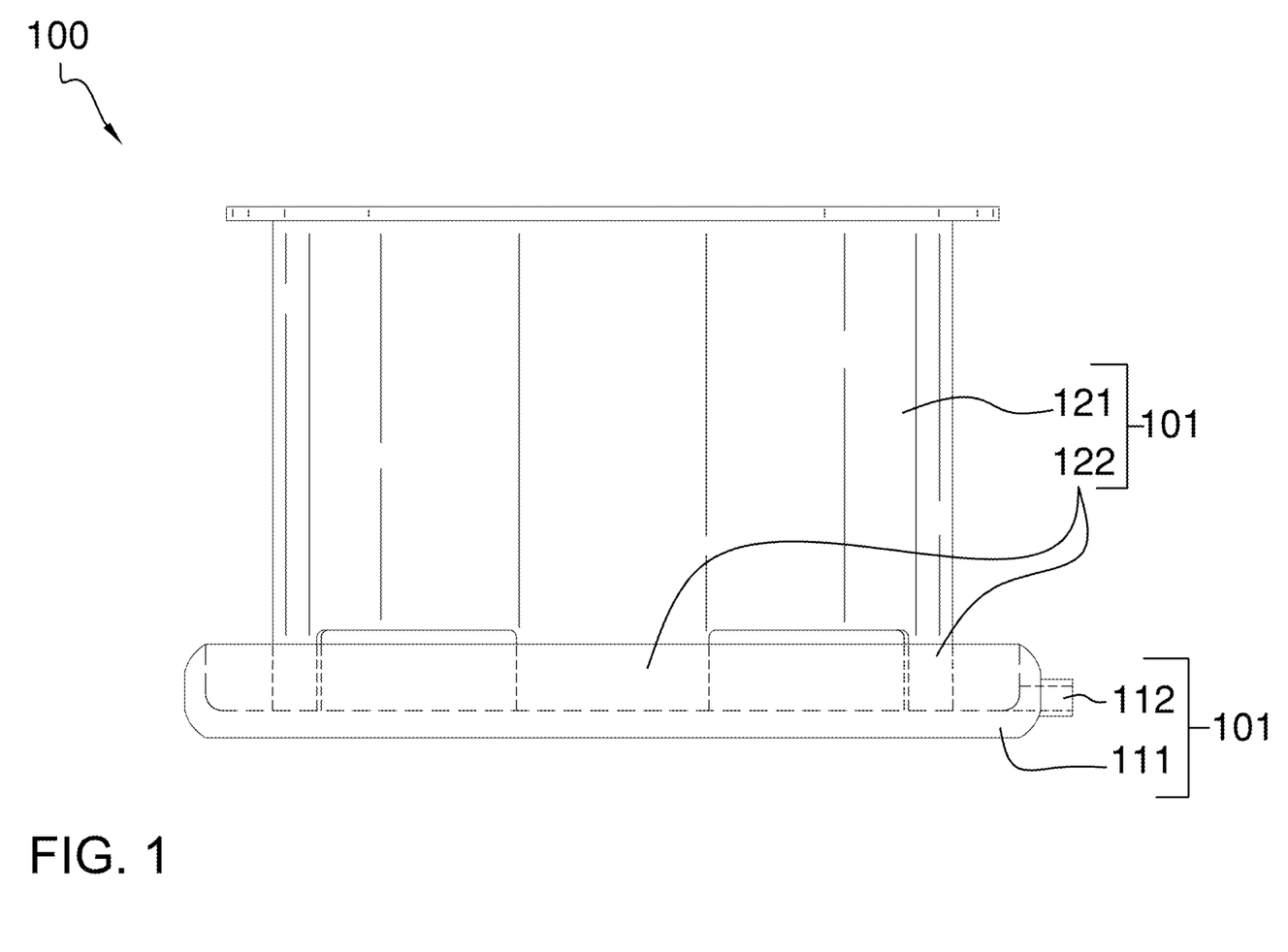
FIG. 1 is a front view of an embodiment of the disclosure.
Figure 2:
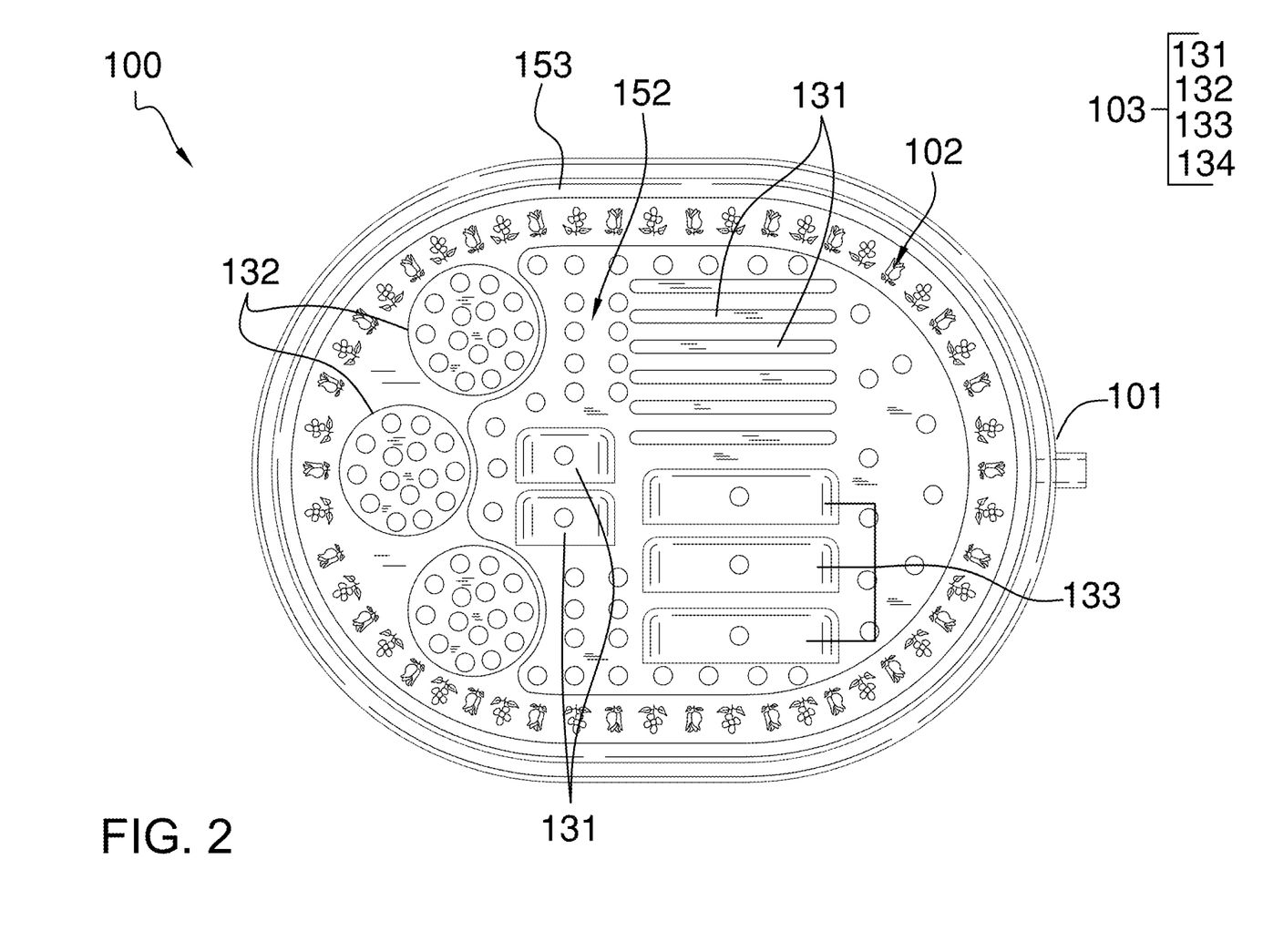
FIG. 2 is a top view of an embodiment of the disclosure.
Figure 3:
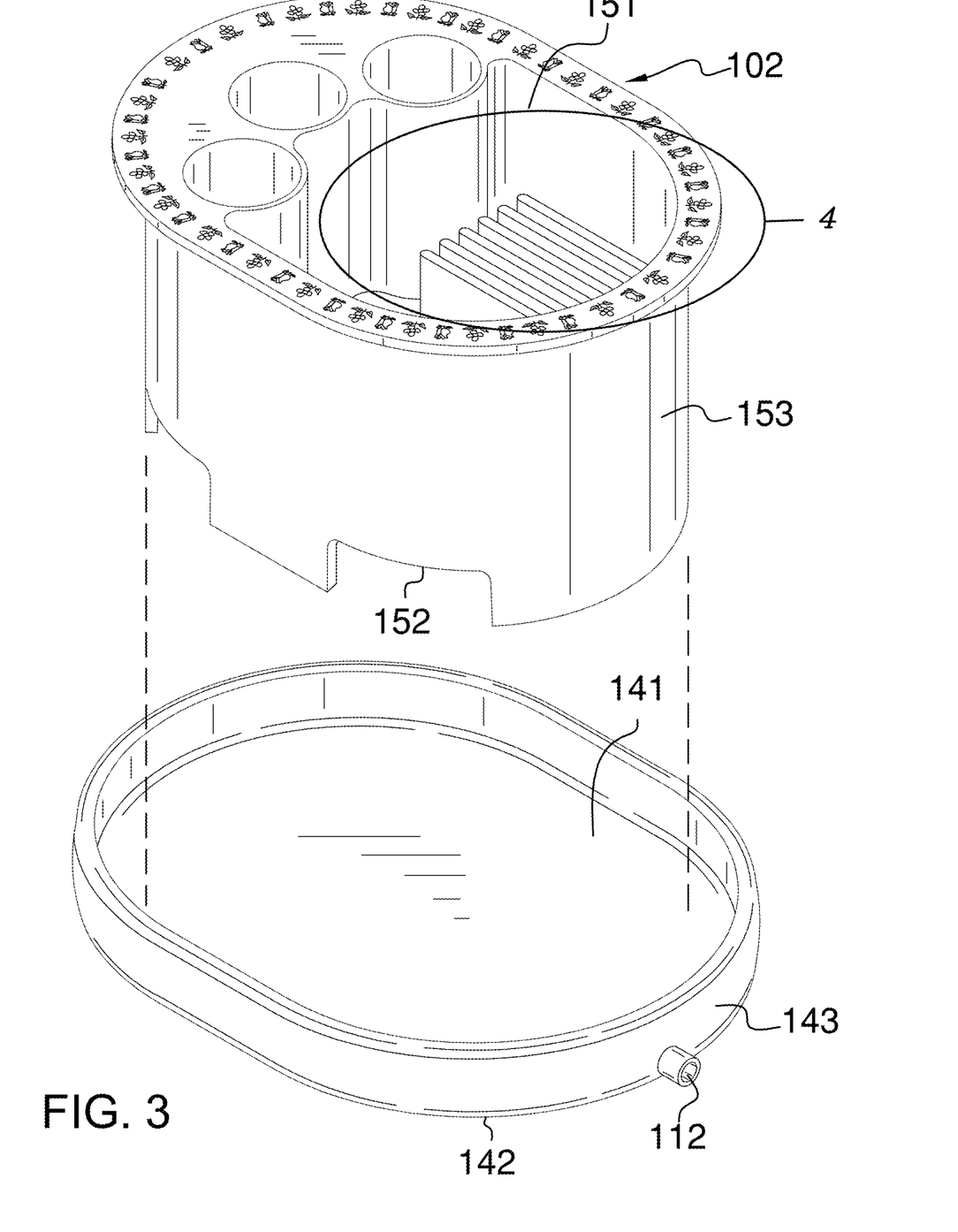
FIG. 3 is an exploded view of an embodiment of the disclosure.
Figure 4:
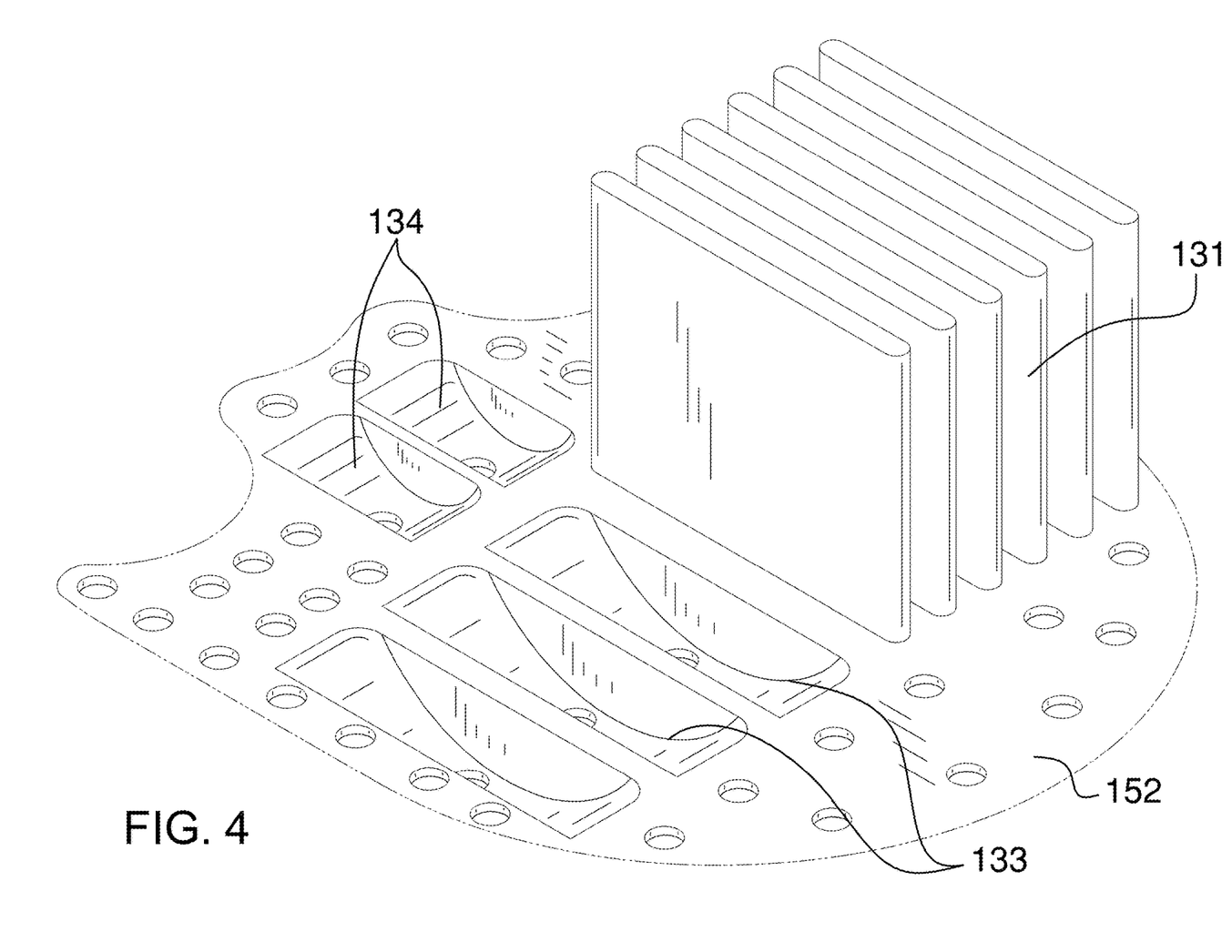
FIG. 4 is a detail view of an embodiment of the disclosure.
Figure 5:
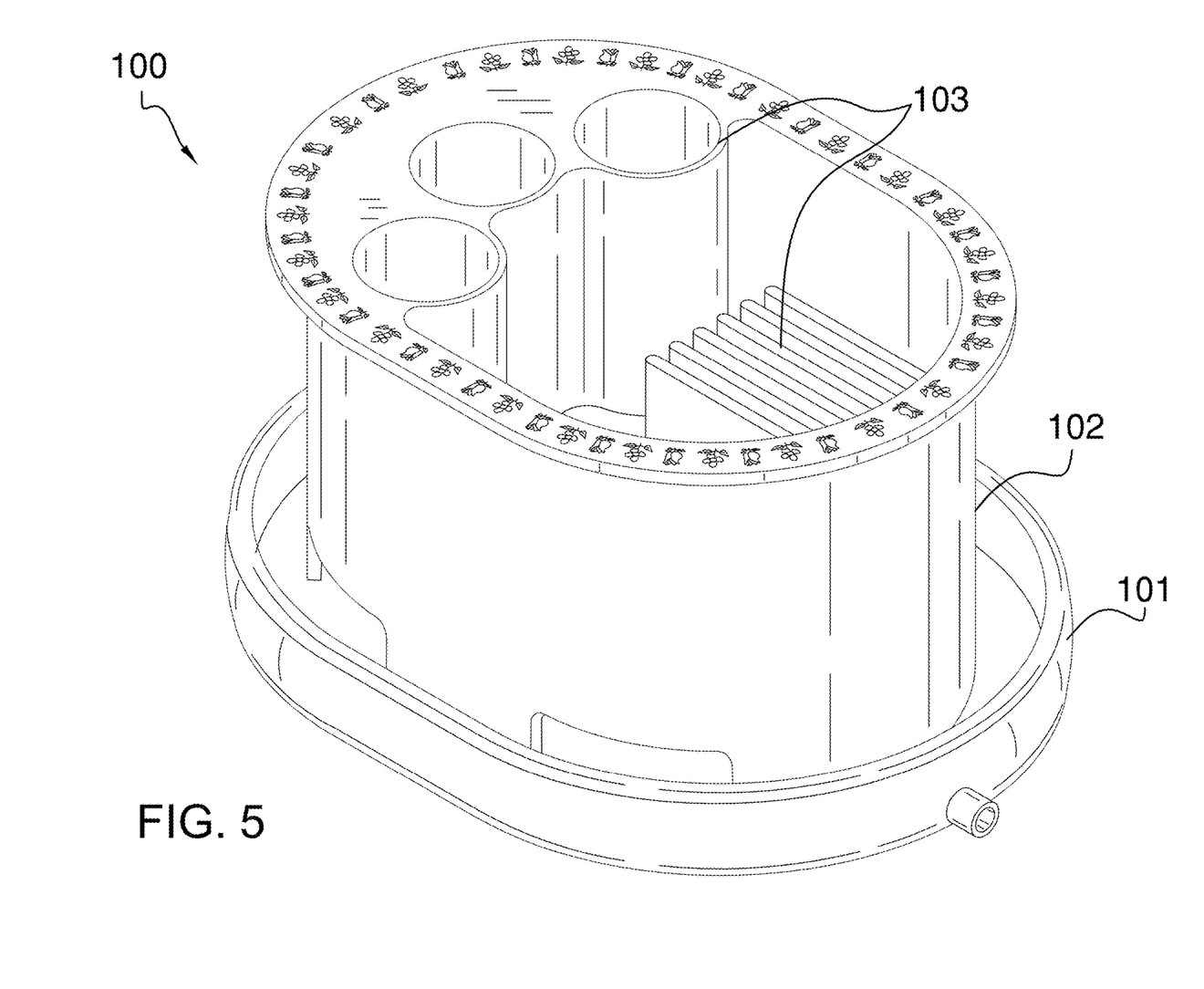
FIG. 5 is a perspective view of an embodiment of the disclosure.

Detailed reference will now be made to one or more potential embodiments of the disclosure, which are illustrated in FIGS. 1 through 5

The improved dish stand 100 (hereinafter invention) is a is a mechanical device. The invention 100 is configured for use with cookware, crockery, and cutlery. The invention 100 forms a containment structure that elevates the cookware, crockery, and cutlery above a supporting surface. The invention 100 receives the cookware, crockery, and cutlery while the cookware, crockery, and cutlery is wet. The invention 100 forms a structure that: a) allows gravity to drain water from the cookware, crockery, and cutlery; and, b) provides a flow path that transports the drained water into the DWV of a domestic plumbing system. The invention 100 comprises a pedestal structure 101, a stand structure 102 and a plurality of segregated spaces 103. The pedestal structure 101 is a load bearing structure that elevates the stand structure 102 above the supporting surface. The plurality of segregated spaces 103 are formed within the stand structure 102. The stand structure 102 forms the physical structure that receives the cookware, crockery, and cutlery.

The pedestal structure 101 is a mechanical structure. The pedestal structure 101 is a load bearing structure. The pedestal structure 101 has the primary shape of a prism. The pedestal structure 101 has a pan shape. The stand structure 102 is geometrically similar to the pedestal structure 101. The stand structure 102 is sized such that the stand structure 102 inserts into the pedestal structure 101. The pedestal structure 101 elevates the stand structure 102 above a supporting surface. The pedestal structure 101 forms the load path that transfers the loads of the stand structure 102 and the cookware, crockery, and cutlery to the supporting surface.

The pedestal structure 101 is a fluid impermeable structure. Any water on the cookware, crockery, and cutlery contained from the stand structure 102 is gravity fed into the pan shape of the pedestal structure 101. The pedestal structure 101 forms a fluidic connection with the dwv of the domestic plumbing system. The pedestal structure 101 forms a flow path that transports the received water to the dwv of the domestic plumbing system.

The pedestal structure 101 comprises a pedestal pan structure 111 and a dwv drain structure 112.

The dwv drain structure 112 is a fluidic connection that drains the water received from the stand structure 102 into the dwv of the domestic plumbing system. The dwv drain structure 112 forms a fluidic connection with the dwv of the domestic plumbing system. The dwv drain structure 112 forms the head of the flow path that transports the received water to the dwv of the domestic plumbing system.

The pedestal pan structure 111 is a prism shaped structure. The pedestal pan structure 111 has a pan shape. The pedestal pan structure 111 forms the primary shape of the pedestal structure 101. The pedestal pan structure 111 is a fluid impermeable structure. The pedestal pan structure 111 forms the containment structure that receives the water that is gravity fed from the cookware, crockery, and cutlery contained in the stand structure 102. The pedestal pan structure 111 further comprises a pedestal open face 141, a pedestal closed face 142, and a pedestal lateral face 143.

The pedestal open face 141 forms the open face of the pan shape of the pedestal structure 101. The pedestal open face 141 forms the superior face of the pedestal structure 101. The stand structure 102 inserts into the pedestal structure 101 through the pedestal open face 141.

The pedestal closed face 142 forms the closed face of the pan shape of the pedestal structure 101. The pedestal closed face 142 forms the inferior face of the pedestal structure 101. The pedestal closed face 142 is the face of the pedestal structure 101 that is distal from the pedestal open face 141.

The pedestal closed face 142 forms the horizontally oriented containment surface of the pedestal structure 101.

The pedestal lateral face 143 form the lateral face structure of the pedestal structure 101. The pedestal lateral face 143 form the vertically oriented containment surfaces of the pedestal structure 101.

The stand structure 102 is a mechanical structure. The stand structure 102 is a load bearing structure. The stand structure 102 has the primary shape of a prism. The stand structure 102 has a pan shape. The stand structure 102 is geometrically similar to the pedestal open face 141 of the pedestal structure 101. The stand structure 102 inserts into the pedestal structure 101 through the pedestal open face 141. The stand structure 102 is a hollow structure. The stand structure forms a container used to store the cookware, crockery, and cutlery. The stand structure 102 contains the cookware, crockery, and cutlery as any water on the cookware, crockery, and cutlery drains into the stand structure 102. The stand structure 102 is a foraminous structure. Any water on the cookware, crockery, and cutlery flows through the foraminous structure of the stand structure 102 into the pedestal structure 101.

The stand structure 102 comprises a stand pan structure 121 and a footing structure 122.

The stand pan structure 121 is a prism shaped structure. The stand pan structure 121 has a pan shape. The stand pan structure 121 forms the primary shape of the stand structure 102. The stand pan structure 121 forms the storage space that contains the cookware, crockery, and cutlery. The stand pan structure 121 is a foraminous structure. The foraminous structure of the stand pan structure 121 allows the water that drains from the pedestal structure 101 to flow directly into the pedestal pan structure 111 of the pedestal structure 101. The stand pan structure 121 further comprises a stand open face 151, a stand closed face 152, and a stand lateral face 153.

The stand open face 151 forms the open face of the pan shape of the stand structure 102. The stand open face 151 forms the superior face of the stand structure 102. The cookware, crockery, and cutlery insert into the stand structure 102 through the stand open face 151.

The stand closed face 152 forms the closed face of the pan shape of the stand structure 102. The stand closed face 152 forms the inferior face of the stand structure 102. The stand closed face 152 is the face of the stand structure 102 that is distal from the stand open face 151. The stand closed face 152 is a foraminous structure. The stand closed face 152 forms a horizontal oriented boundary surface of the hollow interior of the stand structure 102. The foraminous structure of the stand closed face 152 allows water to drain from the stand structure 102 into the pedestal structure 101.

The stand lateral face 153 forms the lateral face structure of the stand structure 102. The stand lateral face 153 forms the vertically oriented containment surfaces of the stand structure 102.

The footing structure 122 is a load bearing structure. The footing structure 122 mounts on the exterior surface of the stand closed face 152 of the stand structure 102. The footing structure 122 forms the structure of the stand structure 102 that rests on the interior surface of the pedestal closed face 142 of the pedestal structure 101.

The footing structure 122 transfers the loads of the stand structure 102 and the cookware, crockery, and cutlery to the pedestal structure 101. The footing structure 122 elevates the stand closed face 152 of the stand structure 102 above the pedestal closed face 142 of the pedestal structure 101. The footing structure 122 forms a negative space between the exterior surface of the stand closed face 152 and the interior surface of the pedestal closed face 142. The negative space formed between the stand closed face 152 and the pedestal closed face 142 allows the water drained from the stand pan structure 121 into the pedestal pan structure 111 to accumulate the water before the water flows into the dwv drain structure 112.

The plurality of segregated structures 103 is a segregated space formed within the pedestal structure 101. The plurality of segregated structures 103 forms a segregated used to separate the crockery and cutlery items contained within the pedestal structure 101. The plurality of segregated structures 103 assists in organizing the pedestal structure 101 contained within the pedestal structure 101. The plurality of segregated structures 103 comprises a plurality of plate dividers 131, a plurality of cutlery pans 132, a plurality of bowl cavities 133, and a plurality of cup cavities 134.

Each plate divider selected from the plurality of plate dividers 131 is a disk-shaped structure. The lateral face of each plate divider selected from the plurality of plate dividers 131 mounts on the interior surface of the stand closed face 152 of the stand pan structure 121. The congruent ends of the disk structure of each plate divider selected from the plurality of plate dividers 131 are vertically oriented. The disk structure of each plate divider selected from the plurality of plate dividers 131 project away from the stand closed face 152 in the superior direction. The space formed between any two adjacent plate dividers selected from the plurality of plate dividers 131 forms a protected space that receives and protects a disk-shaped crockery item such as a plate.

Each cutlery pan selected from the plurality of cutlery pans is a pan shaped structure. Each cutlery pan selected from the plurality of cutlery pans 132 rests on the interior surface of the stand closed face 152 of the stand pan structure 121 of the stand structure 102. Each cutlery pan selected from the plurality of cutlery pans 132 forms a protected space that receives and protects a one or more cutlery items such as forks, spoons, and knives.

Each bowl cavity selected from the plurality of bowl cavities 133 is a pan shaped structure. Each bowl cavity selected from the plurality of bowl cavities 133 is a cavity formed in the interior surface of the stand closed face 152 of the stand pan structure 121 of the stand structure 102. Each bowl cavity selected from the plurality of bowl cavities 133 is geometrically similar to a crockery item such as a bowl. Each bowl cavity selected from the plurality of bowl cavities 133 forms a protected space that receives the selected crockery item. Each bowl cavity selected from the plurality of bowl cavities 133 is sized such that the selected crockery item rests in the selected bowl cavity.

Each cup cavity selected from the plurality of cup cavities 134 is a pan shaped structure. Each cup cavity selected from the plurality of cup cavities 134 is a cavity formed in the interior surface of the stand closed face 152 of the stand pan structure of the stand structure 102. Each cup cavity selected from the plurality of cup cavities 134 is geometrically similar to a crockery item such as a cup. Each cup cavity selected from the plurality of cup cavities 134 forms a protected space that receives the selected crockery item. Each bowl cavity selected from the plurality of cup cavities 134 is sized such that the selected crockery item rests in the selected bowl cavity.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Barrier: As used in this disclosure, a barrier is a physical obstacle that forms a boundary between a first space and a second space. The barrier prevents the passage of an object between the first space and the second space.

Bowl: As used in this disclosure, a bowl is a rounded hollow containment structure used to store foodstuffs, bulk solids, or other liquids. The bowl has the rough shape of a pan.

Cant: As used in this disclosure, a cant is an angular deviation from one or more reference lines (or planes) such as a vertical line (or plane) or a horizontal line (or plane).

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Cavity: As used in this disclosure, a cavity is a negative space that is formed into but not through an object.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Container: As used in this disclosure, a container is a structure that forms a protected space (or protection space) used to store and transport an object. The term containment structure is a synonym for container.

Cookware: As used in this disclosure, cookware refers to containers or tools used in the preparation of foodstuff. Within this definition, cookware includes, but is not limited to, items such as pots, pans, and bowls. Within this definition, tools include, but are not limited to, cutting boards, colanders, mixing tools, cutting tools, and measuring devices.

Correspond: As used in this disclosure, the term correspond is used as a comparison between two or more objects wherein one or more properties shared by the two or more objects match, agree, or align within acceptable manufacturing tolerances.

Crockery: As used in this disclosure, crockery is a general term that refers to plates, bowls, cups, and other vessels that are used in the serving of food and beverages. As used in this disclosure, the term crockery includes vessels such as the cups, glasses or bottles used for the consumption of beverages. As used in this disclosure, the term crockery excludes cutlery.

Cup: As used in this disclosure, a cup is a container that is intended to contain a fluid. The cup has a shape that roughly corresponds to a pan. Glass, mug, stein, and tumbler are a synonyms for a cup.

Cutlery: As used in this disclosure, cutlery refers to one or more hand tools used by humans for the consumption of food. Common items of cutlery include, but are not limited to, forks, knives, or spoons. The term silverware is commonly used to describe cutlery.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Domestic Plumbing System: As used in this disclosure, a domestic plumbing system refers to a fluidic network that is formed within a building. The domestic plumbing system transports water received from a utility through the building. Specifically, the domestic plumbing system: a) receives fresh water from the utility and distributes the fresh water through the building; and, b) transports gray water generated within the building and returns the gray water back to the utility for disposal. The domestic plumbing system comprises a supply side and a DWV.

DWV: As used in this disclosure, DWV is an acronym for drainage, waste, and vent. With a domestic plumbing system, DWV refers to the plumbing subnetwork that transports waste water out of the residence to an appropriate waste water handling system.

Drain: As used in this disclosure, a drain is a mechanical structure that uses gravity to remove a fluid from a space.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluid Impermeable: As used in this disclosure, the term fluid impermeable refers to: a) the ability of a structure to not allow a fluid to pass through the structure; or, b) the ability of a material not absorb through the exterior surfaces of the material a fluid that the material is immersed in or exposed to.

Footing: As used in this disclosure, a footing refers to one of a plurality of small pedestals that combine to: a) raise an object above a supporting surface; and, b) transfer the load path of the object to the supporting surface.

Foodstuff: As used in this disclosure, a foodstuff refers to an edible material that is used as food or a beverage.

Foraminous: As used in this disclosure, foraminous is an adjective that describes a surface, plate, disk, or platform that is perforated with a plurality of apertures.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Ledge: As used in this disclosure, a ledge is a plate structure that projects away from a surface structure. A ledge that projects away from, or overhangs, the surface structure in the manner of a cantilever is referred to as an undercut ledge.

Lip: As used in this disclosure, a lip refers to the region of the lateral face of a pan or tube structure that abuts the perimeter of the open face of the pan or tube structure. By abutting the perimeter of the open face is meant that the lip forms a brink with the surface that forms the perimeter of the open face. The lip of the interior surface of the pan structure is called the interior lip. The lip of the exterior surface of the pan structure is called the exterior lip. The region of the lateral face of a pan structure that abuts the perimeter of the closed face of the pan structure is called the brink lip.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction. In a one to one correspondence, the first element of the first set is said to be associated to the second element of the second set to which the first element corresponds.

Pan: As used in this disclosure, a pan is a hollow containment structure. The pan has a shape selected from the group consisting of: a) a prism; and, b) a truncated pyramid. The pan has a single open face. The open face of the pan is often, but not always, the superior face of the pan. The open face is a surface selected from the group consisting of: a) a congruent end of the prism structure that forms the pan; b) a lateral face of the prism structure that forms the pan, c) the base face of the truncated pyramid structure; and, d) the truncated face of the truncated pyramid structure. A semi-enclosed pan refers to a pan wherein the closed end of prism structure of the pan and/or a portion of the lateral face of the pan is also open.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Plate: As used in this disclosure, a plate is a shallow concave crockery item. The superior surface of the plate presents a concave surface. The concave surface contains fluids associated with a foodstuff. By shallow is meant that the span of the vertical depth from the apex of the concave surface to the superior edge of the concave surface is such that foodstuffs contained in the plate can be cut from a horizontal angle of attack.

Primary Shape: As used in this disclosure, the primary shape refers to a description of the rough overall geometric shape of an object that is assembled from multiple components or surfaces. The term essential primary shape is used to indicate the exclusion of functional items that are attached to the structure of the primary shape.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

Roughly: As used in this disclosure, roughly refers to a comparison between two objects. Roughly means that the difference between one or more parameters of the two compared objects are not significantly different.

Segregated Space: As used in this disclosure, a segregated space refers to a first negative space that does not overlap with a second negative space. By overlap is meant that that the first negative space and a second negative space do not share any common spaces. As a practical matter, when two negative spaces are formed such that a fluid will not flow between the two negative spaces, the two negative spaces can be considered segregated.

Superior: As used in this disclosure, the term superior refers to a directional reference that is parallel to and in the opposite direction of the force of gravity when an object is positioned or used normally.

Supply Side: As used in this disclosure, the supply side refers to the plumbing subnetwork within a domestic plumbing system that provisions fresh water for use within the residence.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A dish stand comprising
    a pedestal structure, a stand structure and a plurality of segregated spaces;
    wherein the pedestal structure is a load bearing structure that elevates the stand structure above a supporting surface;
    wherein the plurality of segregated spaces are formed within the stand structure;
    wherein the stand structure has a pan shape that forms a container;
    wherein the stand structure is a foraminous structure;
    wherein the plurality of segregated structures comprises a plurality of plate dividers, a plurality of cutlery pans, a plurality of bowl cavities, and a plurality of cup cavities;
    wherein a lateral face of each plate divider selected from the plurality of plate dividers mounts on an interior surface of a stand closed face of the stand pan structure;
    wherein each bowl cavity selected from the plurality of bowl cavities is a cavity formed in the interior surface of the stand closed face of the stand structure;
    wherein each cutlery pan selected from the plurality of cutlery pans rests on the interior surface of the stand closed face of the stand pan structure of the stand structure;
    wherein each cup cavity selected from the plurality of cup cavities is a cavity formed in the interior surface of the stand closed face of the stand pan structure of the stand structure.

2. The dish stand according to claim 1 wherein the dish stand forms a structure that: a) allows gravity to drain water from the stand structure; and, b) provides a flow path that transports the drained water.

3. The dish stand according to claim 2
    wherein the pedestal structure is a mechanical structure;
    wherein the pedestal structure has a pan shape.

4. The dish stand according to claim 3
    wherein the stand structure is geometrically similar to the pedestal structure;
    wherein the stand structure is sized such that the stand structure inserts into the pedestal structure;
    wherein the pedestal structure forms a load path that transfers a load of the stand structure to the supporting surface.

5. The dish stand according to claim 4
    wherein the pedestal structure is a fluid impermeable structure;
    wherein the water from the stand structure is gravity fed into the pan shape of the pedestal structure.

6. The dish stand according to claim 5
    wherein the stand structure is a mechanical structure;
    wherein the stand structure is a load bearing structure;
    wherein the stand structure is geometrically similar to a pedestal open face of the pedestal structure.

7. The dish stand according to claim 6
    wherein the plurality of segregated structures is a segregated space formed within the stand structure;
    wherein the plurality of segregated structures forms a segregated used to separate the crockery and cutlery items contained within the stand structure;
    wherein the plurality of segregated structures assists in organizing the stand structure contained within the stand structure.

8. The dish stand according to claim 7
    wherein the pedestal structure comprises a pedestal pan structure and a dwv drain structure;
    wherein the dwv drain structure is a fluidic connection that drains the water received from the stand structure;
    wherein the pedestal pan structure forms a primary shape of the pedestal structure;
    wherein the pedestal pan structure forms a containment structure that receives the gravity fed water.

9. The dish stand according to claim 8
    wherein the pedestal pan structure further comprises a pedestal open face, a pedestal closed face, and a pedestal lateral face;
    wherein the pedestal open face forms the open face of the pan shape of the pedestal structure;
    wherein the pedestal open face forms a superior face of the pedestal structure;
    wherein the stand structure inserts into the pedestal structure through the pedestal open face;
    wherein the pedestal closed face forms a closed face of the pan shape of the pedestal structure;
    wherein the pedestal closed face forms an inferior face of the pedestal structure;
    wherein the pedestal closed face is a face of the pedestal structure that is distal from the pedestal open face;
    wherein the pedestal closed face forms a horizontally oriented containment surface of the pedestal structure;
    wherein the pedestal lateral face form a lateral face structure of the pedestal structure;
    wherein the pedestal lateral face form vertically oriented containment surfaces of the pedestal structure.

10. The dish stand according to claim 9
    wherein the stand structure comprises a stand pan structure and a footing structure;
    wherein the stand pan structure forms a primary shape of the stand structure;
    wherein the foraminous structure of the stand pan structure allows the water that drains from the pedestal structure to flow directly into the pedestal pan structure of the pedestal structure;
    wherein the footing structure is a load bearing structure;
    wherein the footing structure mounts on an exterior surface of the stand closed face of the stand structure;
    wherein the footing structure forms a structure of the stand structure that rests on an interior surface of the pedestal closed face of the pedestal structure;
    wherein the footing structure transfers the loads of the stand structure to the pedestal structure;
    wherein the footing structure elevates the stand closed face of the stand structure above the pedestal closed face of the pedestal structure;
    wherein the footing structure forms a negative space between the exterior surface of the stand closed face and the interior surface of the pedestal closed face;
    wherein the negative space formed between the stand closed face and the pedestal closed face allows the water drained from the stand pan structure into the pedestal pan structure to accumulate.

11. The dish stand according to claim 10
wherein the stand pan structure further comprises a stand open face, a stand closed face, and a stand lateral face;
wherein the stand open face forms the open face of the pan shape of the stand structure;
wherein the stand open face forms a superior face of the stand structure;
wherein the stand closed face forms a closed face of the pan shape of the stand structure;
wherein the stand closed face forms an inferior face of the stand structure;
wherein the stand closed face is a face of the stand structure that is distal from the stand open face;
wherein the stand closed face forms a horizontal oriented boundary surface of a hollow interior of the stand structure;
wherein the stand closed face allows water to drain from the stand structure into the pedestal structure;
wherein the stand lateral face forms a lateral face structure of the stand structure;
wherein the stand lateral face forms a vertically oriented containment surfaces of the stand structure.

12. The dish stand according to claim 11
wherein each plate divider selected from the plurality of plate dividers is a disk-shaped structure;
wherein congruent ends of the disk structure of each plate divider selected from the plurality of plate dividers are vertically oriented;
wherein the disk structure of each plate divider selected from the plurality of plate dividers project away from the stand closed face in a superior direction;
wherein each cutlery pan selected from the plurality of cutlery pans forms a protected space;
wherein each bowl cavity selected from the plurality of bowl cavities forms a protected space;
wherein each cup cavity selected from the plurality of cup cavities forms a protected space.

* * * * *